Figure 7:
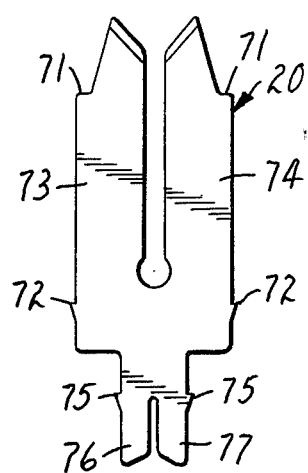

United States Patent [19]

Baribeau

[11] 4,449,777
[45] May 22, 1984

[54] DROP WIRE CONNECTOR

[75] Inventor: Gary A. Baribeau, Troy, Wis.

[73] Assignee: Minnesota Mining and Manufacturing Company, St. Paul, Minn.

[21] Appl. No.: 353,050

[22] Filed: Mar. 1, 1982

[51] Int. Cl.³ .................... H01R 4/24; H01R 13/58
[52] U.S. Cl. ........................ 339/103 R; 339/99 R; 339/116 C
[58] Field of Search .................... 339/95–99, 339/115 R–116 C, 339, 103 R

[56] References Cited

U.S. PATENT DOCUMENTS

| | | | |
|---|---|---|---|
| 2,352,224 | 6/1944 | Read | 339/98 X |
| 3,496,522 | 2/1970 | Ellis et al. | 339/99 R |
| 3,611,264 | 10/1971 | Ellis | 339/99 R |
| 3,985,416 | 10/1976 | Dola et al. | 339/98 |
| 4,066,321 | 1/1978 | Villazon | 339/98 |

Primary Examiner—Eugene F. Desmond
Attorney, Agent, or Firm—Donald M. Sell; James A. Smith; Terryl K. Qualey

[57] ABSTRACT

An electrical drop wire connector for facilitating the connection of drop wires to overhead communication cables has spring compression reserve connection to both drop wire and cable wire. Test ports permit electrical testing of the installation. Easy access to the contact area for removal and replacement of drop wires is provided.

11 Claims, 10 Drawing Figures

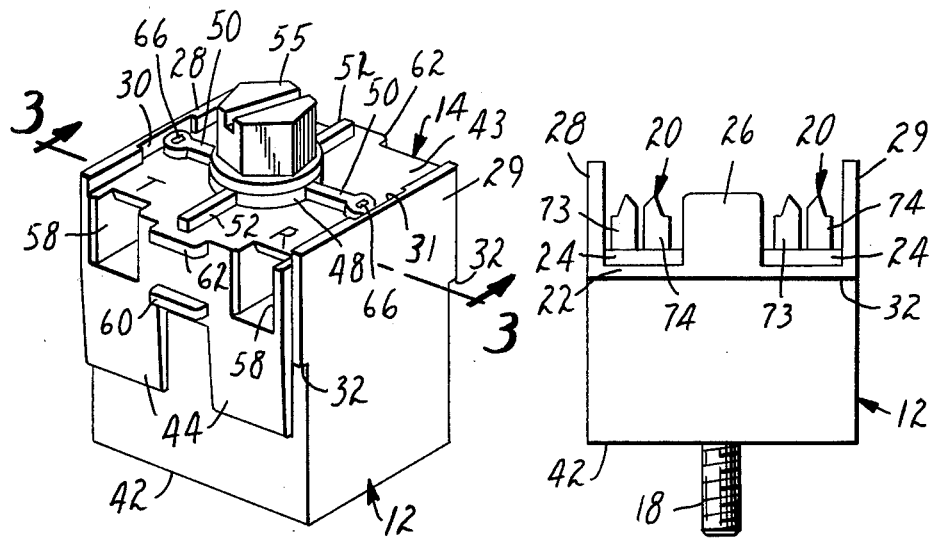
FIG. 1     FIG. 2
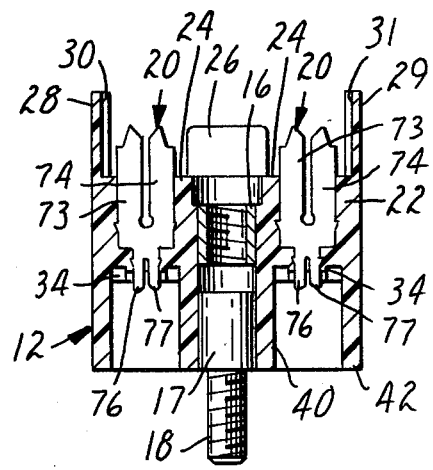 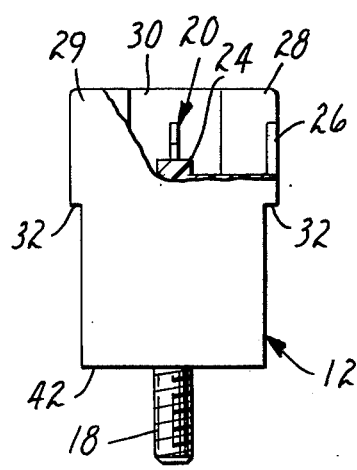
FIG. 3     FIG. 4
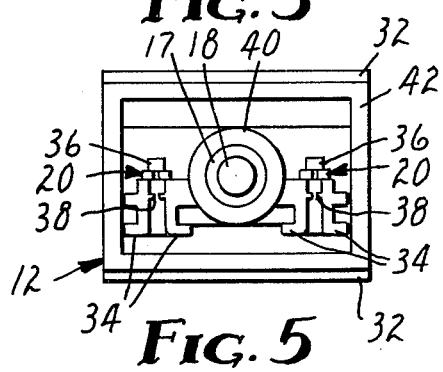 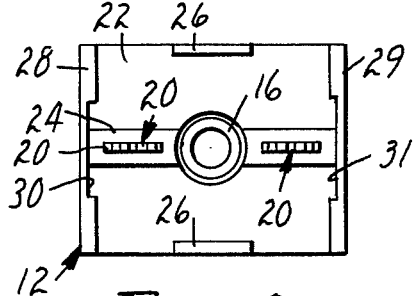
FIG. 5     FIG. 6

DROP WIRE CONNECTOR

This invention relates to the communications industry, more specifically to the attachment of drop wires to communication service lines, and in particular to novel time-saving wire connectors for use therein.

Drop wires are used in making interconnection between overhead communication lines and subscriber's installations. Typically, a drop wire will consist of two parallel copper-clad steel wires within an insulating sheath of plastic or rubber designed to permit separation of the two insulated conductors. Connection to appropriate overhead lines is accomplished at connector blocks attached to said lines at appropriate locations. These connector blocks ordinarily terminate in screw type binding posts. To attach a drop wire, the conductors must be terminally separated, bared of insulation, wound about the appropriate binding post, tightened in place, and protected from moisture and other contaminants or disturbing influences.

Efforts to facilitate the attaching of drop wires have been made. As an example, U.S. Pat. No. 4,040,701 describes a quick connector for service wires in which two insulation penetrating quick-connect terminals are forced over the insulation coupled conductors. Contact between terminals and individual wires of the overhead cable is accomplished by wire-wrap procedures requiring stripping of insulation. The structure does not permit subsequent direct access to the terminals for test purposes.

The present invention makes available a connector which incorporates a number of additional advantages. The drop wire conductors are widely separated at their contact areas. Any necessity for removal of insulation is avoided both at the drop wire and at the cable. Drop wires may be inserted, removed, and the same or others reinserted for up to at least a hundred cycles while continuing to achieve entirely effective electrical contact. Introduction of test probes is permitted. Other advantages will become apparent as the description proceeds.

Figure 8:
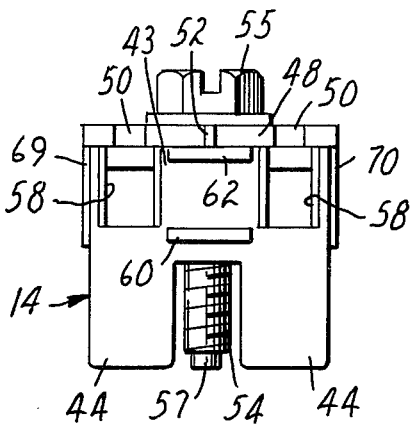
Figure 9:
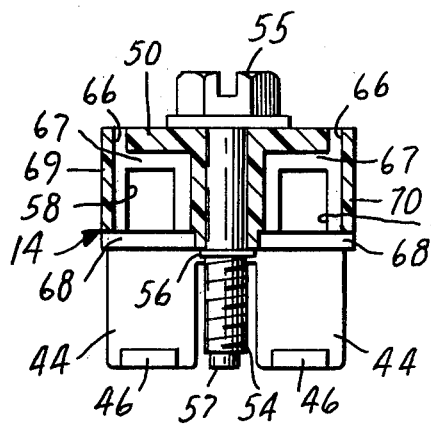
Figure 10:
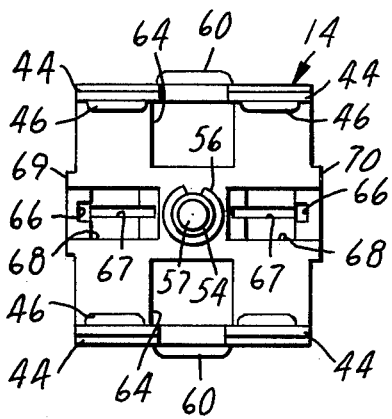

In the drawings,

FIG. 1 is a view in perspective showing one unit of an exemplary connector of the invention in its fully closed condition, FIG. 2 is a front elevation of the body member, FIG. 3 is a central cross-sectional elevation of the body taken at section 3—3 of FIG. 1, FIG. 4 is an end elevation of the body with a portion cut away to show inner detail, FIG. 5 is a bottom plan view of the body, FIG. 6 is a top plan view of the body, FIG. 7 is a side elevation on an enlarged scale of one of the contact elements, FIG. 8 is a front elevation of the cap, FIG. 9 is a central cross-sectional elevation of the cap taken at section 3—3 of FIG. 1, and FIG. 10 is a bottom plan view of the cap.

The connector unit will be seen to consist of a body 12 and a cap 14. For convenience only a single unit is shown; however it is to be understood that the body may, and usually will, be extended as several units side by side, each with its separate cap, and with such minor alterations in body structure as may be required. For example, a presently preferred assembly is made up of five units.

A centrally positioned, cylindrical, lower extension 40 of the body contains an internally threaded metal socket insert 16 and may additionally contain the head 17 of an externally threaded stud 18, as shown in FIG. 3. In an assembly of units, two of such studs will ordinarily be included to serve as means for mounting the assembly, the cylindrical extensions 40 of the remaining units then being closed across the lower end.

Metal contact elements 20 fit into narrow slots extending vertically adjacent both sides of the extension 40 through the central mass 22 of the body and through narrow square-edged ridges 24 extending centrally along the upper surface of the mass 22. Tabs 26 are centrally disposed at front and rear edges, and end extensions 28, 29 are disposed across the end edges, of the upper surface of the body. These latter extensions are inwardly shallowly channeled as at channels 30, 31 seen in FIG. 6. The lower outer sides of the body are constricted to form lateral edges 32, seen in FIG. 4.

Opposing ridges 34 depending from the central mass 22 of the body 12 abut one side of the lower bifurcate ends of elements 20 at the lower surface of the central mass 22, the channel between them leading in each case to the central slot of the element. Narrow fins 38 extend from ridges 34 part way into the intervening channel. On the opposite side of the element, and in line with the central slot, is provided a square-edged block cut-off 36.

An outer wall 42 surrounds the lower portion of the body, or is extended to surround the assembly of body units.

The cap 14 is dimensioned to fit over the top of the body 12 as indicated in FIG. 1. It includes a main mass 43 and depending front and rear arms 44, each having at its central inner end a retaining wedge 46. The upper surface has a central circular ridge 48 from which straight ridges 50, 52 extend longitudinally. The cap is centrally perforate and holds a drive screw 54, freely rotatable but held in place by a snap ring 56. The screw has a slotted hex head 55, and a dogpoint 57 at the end of the threaded shank.

Wire-receiving channels 58 of rectangular cross-section extend nearly through the cap from the front face. The entry edges are chamfered and the upper edge is cut back for a short distance, as best seen in FIG. 1, for convenience in the inserting of wire ends. Short ridges 60, 62 extend across the central portion of the face and back surfaces just above and below the channels, and serve as retainers for test equipment.

The cap, as seen from beneath in FIG. 10, is deeply recessed at pits 64 in line with the spaces at each side between arms 44, and is perforate and slotted midway between front and back arms and longitudinally outwardly from the central screw 54. Apertures 66 extend through the enlarged ends of ridges 50, and central slots 67 extend into but not through these ridges. The wider openings 68 pass through the lower walls of the channels 58 and extend slightly into central end bulges 69, 70, the latter being dimensioned to slide within channels 30, 31, respectively, for assuring proper orientation of cap and body.

Contact elements 20 are doubly bifurcate as illustrated in FIG. 7. The upper beams 73, 74 are formed to make contact with the drop wire conductors and for this purpose are preferably provided at the wire-receiving tips with sharpened edges for cutting the wire insulation. Unlike many known bifurcate contact elements, this portion of the element is dimensioned to provide unusually powerful spring compression reserve contact with only a single size of wire conductor, such as the 18 gage vinyl insulated copper covered steel wire normally used for drop wires, and therefore is not required to undergo extreme flexing. Shoulders 71 are provided near the upper ends, and barbs 72 near the lower ends, of the beams 73, 74. Barbs 75 are also provided at the edges of the lower beams 76, 77. Because they are to make contact with copper rather than steel wires, these lower beams need not have the greater width of the upper beams.

The connector is assembled by first forcing the elements 20 into their respective slots in the body. For this purpose a tool, not shown, is provided by which force may be applied at the shoulders 71. The barbs 72, 75 then act to prevent subsequent loosening or withdrawal of the elements from the insulating body. Both upper and lower bifurcate ends of the element 20 are exposed, as shown in FIG. 3.

The cap is then positioned over the body and pressed into place, with the end bulges 69, 70 sliding into the channels 30, 31. The arms 44 flex sufficiently to allow the wedges 46 to pass over the upper wall and below the edges 32, so that the cap cannot later be easily removed. The dogpoint 57 fits within the open end of the interiorly threaded insert 16, keeping the screw and insert in line for quick connection while avoiding any possible injury to the threads.

Contact between cable and connector may be made by forcing the appropriate wires of the cable into the slots between the ridges 34 and into the slots in the lower ends of the elements 20. The wires are removably retained between the ridges during initial positioning and prior to making connection, by fins 38 serving as strain relief elements. Using an appropriate tool, not shown, the wire end is forced between the lower beams 76, 77 of the element 20, into the channel between the ridges, and against the surface of the block 36; any excess length of wire is cut off by shear action between the tool and the square outer edge of the block, and is removed.

After the cable wires have been attached, the rear of the connector is filled with self-hardening insulating liquid such as self-curing resin or hot asphaltum, thereby completely embedding and insulating this area. The walls 42 serve to retain and shape such insulating material. The connector is then ready to be bolted in place for receiving the drop wires.

In a preferred procedure, short wire segments are attached to the lower contacts, and the space filled with insulation, prior to installation on a cable. At the work site the connector is bolted in place and the wire segments connected to the appropriate wires of the cable.

Connection to a drop wire is thereafter quickly and easily accomplished merely by separating the end portions of the two insulated conductors, inserting the ends into the channels 58, and tightening the screw 54. The conductors are forced between the arms of the contact element under stresses sufficient to penetrate and displace the insulating covering and give full compression reserve electrical contact. The wire ends are enclosed and protected.

On occasion it may be desirable to make temporary electrical contact with the connected wires. The apertures 66, together with the shoulders 71, make such testing action readily possible. Probes, not shown, are simply inserted through the apertures and into contact with the shoulder areas of the contact elements. Such action may be readily accomplished even in the presence of silicone grease or such other protective material as may have been initially contained in or introduced into these contact areas.

Again, it is sometimes desirable to break the circuit and remove the drop wire. This too is easily and quickly accomplished, by simply unscrewing the screw 54, which action removes the wires from the contact element and permits them to be withdrawn. The cap remains attached to the body unless deliberately removed, and the same or another drop wire may then be installed, equally effective contact being obtained even after many repetitions of the process.

As an installation convenience, drop wires are regularly supplied with means for distinguishing between the two conductors. In one structure the insulation is lightly ridged along one edge, the adjacent conductor thereby being identified as the ring conductor. It is therefore contemplated to place some form of identification on the connectors of this invention, for example an embossed or raised T and R above the two wire-receiving channels, to show tip and ring positions respectively.

It will be understood that both body and cap are to be formed of electrical insulation material, of which polyamide and polyester are exemplary. It is particularly advantageous to employ a transparent material for the cap, thereby facilitating visual inspection.

What is claimed is as follows:

1. A drop wire connector comprising an insulating body member containing a central threaded socket insert and, at opposite sides thereof, two separate spring compression reserve contact elements retained within the central mass of said body, each of said elements having an upper bifurcate end for receiving and making electrical contact with an insulated copper-coated steel drop wire and a lower bifurcate end for receiving and making electrical contact with an insulated copper wire; an insulating cap member fitting over said body member and carrying a centrally positioned screw member for coacting with said socket insert, in forcing said cap against or away from said body, said cap member being doubly channeled to provide a wire receiving channel in alignment with each of said contact elements and being slotted to provide access for said elements into said channels; said body including centrally channeled upward end extensions and said cap including central end bulges slidably fitting within the channels of said end extensions and arms extending downwardly from front and rear edges; and means, including said end extensions, and said arms, for enclosing the space surrounding said upper bifurcate ends of said contact elements when said connector is in its extended open position.

2. The connector of claim 1 wherein said contact elements include narrow flat shoulders at outer upper edges of said upper bifurcate end.

3. The connector of claim 2 wherein the mass of said cap is perforate in alignment with the outer of said shoulders of each of said elements.

4. The connector of claim 1 wherein said body includes opposing ridges defining an open channel in alignment with the open ended slot of said lower bifurcate end of each of said contact elements, each pair of said opposing ridges being provided with strain relief means for temporary retention of a wire in said channel.

5. The connector of claim 4 wherein said body includes a square edged cut-off block disposed centrally of the lower bifurcate end of each said contact member against the side opposite said ridges.

6. A drop wire connector comprising an insulating body member containing a central threaded socket insert and, at opposite sides thereof, two separate spring compression reserve contact elments retained within the central mass of said body, each of said elements having an upper bifurcate end for receiving and making electrical contact with an insulated copper-coated steel drop wire and a lower bifurcate end for receiving and making electrical contact with an insulated copper wire; and an insulating cap member fitting over said body member and carrying a centrally positioned screw member for coacting with said socket insert in forcing said cap against or away from said body, said cap member being doubly channeled to provide a wire receiving channel in alignment with each of said contact elements and being slotted to provide access for said elements into said channels; said body including centrally channeled upward end extensions and central front and rear upwardly extending edge tabs, opposing ridges defining an open channel in alignment with the open ended slot of said lower bifurcate end of each of said contact elements, each pair of said opposing ridges being provided with opposing fins serving as strain relief means for temporary retention of a wire in said channel, and a square edge cut-off block disposed centrally of the lower bifurcate end of each said contact member against the side opposite said ridges; each of said contact elements having narrow flat shoulders at the outer upper edges of said upper bifurcate end; and said cap being perforate in alignment with the outer edges of said shoulders of each of said elements.

7. The connector of claim 6 wherein said body member includes a depending outer wall encircling said lower bifurcate ends of said contact members and said socket insert.

8. The connector of claim 6 wherein said body member is joined in end-to-end relationship with at least one additional said body member, the combination including mounting means for use in fastening the connector to a support, and an outer wall depending from the the edges of the assembly of body members and encircling said lower ends of said contact members.

9. The connector of claim 1 including orienting means for assuring desired orientation between said body and said cap members.

10. The connector of claim 8 wherein each said contact element is in electrical contact at its lower bifurcate end with a separate insulated wire segment and wherein the area of the said contact is embedded in a hardened insulating impregnant.

11. The connector of claim 1 wherein said body includes central front and rear upwardly extending edge tabs and said means for enclosing the space surrounding said upper bifurcate ends of said contact elements when said connector is in its extended open position comprises said end extensions and said tabs on said body and said arms on said cap.

* * * * *